(12) United States Patent
Duchaine et al.

(10) Patent No.: US 8,392,023 B2
(45) Date of Patent: Mar. 5, 2013

(54) PHOTO-INTERRUPTER BASED FORCE SENSING HANDLE AND METHOD OF USE

(75) Inventors: Vincent Duchaine, Quebec (CA); Noemie Paradis, Quebec (CA); Thierry Laliberte, Quebec (CA); Boris Mayer-St-Onge, Quebec (CA); Clement Gosselin, Quebec (CA); Dalong Gao, Troy, MI (US)

(73) Assignees: GM Global Technology Operations LLC, Detroit, MI (US); Universite Laval, Quebec (CA)

( * ) Notice: Subject to any disclaimer, the term of this patent is extended or adjusted under 35 U.S.C. 154(b) by 596 days.

(21) Appl. No.: 12/627,169

(22) Filed: Nov. 30, 2009

(65) Prior Publication Data

US 2011/0129320 A1 Jun. 2, 2011

(51) Int. Cl.
*G05B 15/00* (2006.01)
*G05B 19/00* (2006.01)
*G05B 19/416* (2006.01)
*G01J 1/04* (2006.01)
*G01J 1/42* (2006.01)
*G01J 5/08* (2006.01)
*B25J 1/00* (2006.01)
*B25J 3/00* (2006.01)
*B25J 15/00* (2006.01)
*B25J 19/00* (2006.01)

(52) U.S. Cl. ............. 700/260; 250/227.14; 318/568.18; 414/1; 901/2; 901/47

(58) Field of Classification Search ............. 73/862.324, 73/862.325, 862.451, 862.473, 862.53, 862.624, 73/862.637, 514.31–514.36; 414/1–6, 217–218; 700/59, 245–264; 901/2, 46, 9, 32, 44, 47; 318/568.1–568.25; 250/227.11–227.32
See application file for complete search history.

(56) References Cited

U.S. PATENT DOCUMENTS

| | | | | |
|---|---|---|---|---|
| 4,588,348 A | * | 5/1986 | Beni et al. | 414/730 |
| 4,814,562 A | * | 3/1989 | Langston | 250/227.14 |
| 5,066,856 A | * | 11/1991 | Crouse | 250/229 |
| 5,376,785 A | * | 12/1994 | Chin et al. | 250/214 PR |
| 5,650,704 A | * | 7/1997 | Pratt et al. | 318/623 |
| 6,313,595 B2 | | 11/2001 | Swanson et al. | |
| 6,612,449 B1 | * | 9/2003 | Otani et al. | 212/317 |
| 6,738,691 B1 | * | 5/2004 | Colgate et al. | 700/245 |

(Continued)

FOREIGN PATENT DOCUMENTS

| | | |
|---|---|---|
| DE | 102004063975 A1 | 8/2006 |
| WO | 2008003416 A1 | 1/2008 |

*Primary Examiner* — Khoi Tran
*Assistant Examiner* — Abby Lin
(74) *Attorney, Agent, or Firm* — Quinn Law Group, PLLC

(57) ABSTRACT

A robotic system includes a robot for moving a payload in response to a calculated input force. Sensors in respective sensor housings are connected to a handle, each sensor including a light emitter and receiver. The sensors measure a light beam received by a respective receiver. A controller calculates the calculated input force using received light. Each sensor housing modifies an interruption of the light beam in a sensor when the actual input force is applied, and the controller controls the robot using the calculated input force. A method of controlling the robot includes emitting the light beam, flexing a portion of the sensor housing(s) using the actual input force to interrupt the light beam, and using a host machine to calculate the calculated input force as a function of the portion of the light beam received by the light receiver. The robot is controlled using the calculated input force.

19 Claims, 5 Drawing Sheets

U.S. PATENT DOCUMENTS

| | | | |
|---|---|---|---|
| 7,047,826 B2 * | 5/2006 | Peshkin | 73/862.53 |
| 7,823,485 B2 * | 11/2010 | Rainone | 81/478 |
| 2001/0011690 A1 * | 8/2001 | Luyckx et al. | 242/417.3 |
| 2004/0206611 A1 * | 10/2004 | Kobayashi | 200/10 |
| 2004/0261544 A1 * | 12/2004 | Peshkin | 73/862.53 |
| 2005/0178608 A1 * | 8/2005 | Shiino et al. | 180/444 |
| 2006/0086889 A1 * | 4/2006 | Pascucci et al. | 250/206.1 |
| 2010/0199784 A1 * | 8/2010 | Marin et al. | 73/862.333 |
| 2011/0302694 A1 * | 12/2011 | Wang et al. | 2/160 |

* cited by examiner

PHOTO-INTERRUPTER BASED FORCE SENSING HANDLE AND METHOD OF USE

TECHNICAL FIELD

The present invention relates to a force sensing handle for measuring forces and moment with minimal drift and noise, and a method of using the same.

BACKGROUND OF THE INVENTION

In certain systems, the precise determination of an applied force may be advantageous. For example, in a Human-Robot Interactive (HRI) system, a human operator interfaces directly with a robotic device that, by applying a force to one or more linkages, performs or assists in the performance of a particular task. The operator may apply input in the form of an applied force and/or torque, which a controller must interpret in relation to the task that is being performed. By doing so, the robot as well as the operator form an integrated system which performs the desired tasks. As one of two parts in the system, the robot must be able to work effectively with the human. Therefore, it is a basic goal of any HRI system to allow for a more natural and effective interaction between the human operator(s) and the various integrated components of the robot.

SUMMARY OF THE INVENTION

Accordingly, a system and a method for control thereof are provided herein. The system includes a controller and a robot with which a human operator interfaces via a photo-interrupter based force sensing handle as described herein. The robot may include one or more actuators in the form of motors, brakes, pulleys, cables, and/or other rigid or compliant linkages, with the various actuators collectively operating on a payload or other object. In an automotive assembly environment, for example, an operator may position a relatively cumbersome payload such as an engine or a transmission. In such an environment, a robot in the form of an overhead assist device may be used to help move the payload to facilitate assembly. However, other payloads may also be used with the system and method set forth herein without departing from the intended scope of the invention.

As the operator applies an actual input force to one or more handles, sensors embedded within sensor housings and attached to the handles collectively measure a changing electrical output value, e.g., a voltage or a current output value, that is relatively immune to drift and millivolt-level noise. Such noise may result in measurement errors when conventional strain-based force sensors are used. The sensors of the present invention are connected serially as set forth herein to measure forces in each of the x, y, and z Cartesian directions, and are enclosed within a respective one of the sensor housings. Moreover, one or more links of a serial chain of sensors can include two sensor housings connected in parallel in order to measure torque along an axis perpendicular to the plane formed by the two sensors.

An actual input force and/or torque applied by the operator to a handle displaces the handle in at least one of the x, y, z, and theta (A) directions, with the displacement of the handle ultimately moving a flexible portion of one or more of the sensor housings into a beam path of a light source. Light transmission within each of the various sensors is measured to determine the electrical output value, with the electrical output value ultimately determining the amount and direction of the actual input force being applied to one or more of the handles.

In particular, a robotic system as set forth herein includes a robot adapted for moving a payload in response to a calculated input force, a handle, a plurality of sensors, and a controller. The calculated input force is determined when an operator applies an actual input force to the handle, or to a pair of such handles if so configured. The sensors are each enclosed within a respective housing and are operatively connected to the handle. Each of the sensors includes a light emitter adapted for emitting a light beam, and a light receiver adapted for receiving at least a portion of the emitted light beam. Additionally, each of the sensors measures the portion of the light beam that is received by a respective one of the light receivers. The controller then determines the calculated input force using the portion of the light beam that is received by the light receivers. Each of the sensor housings is adapted to modify an amount of interruption of the light beam when the actual input force is applied by the operator, and the controller automatically controls an action of the robot using the calculated input force.

A control system is also provided for motion control of the robot. The control system includes a plurality of sensor housings each operatively connected to the handle(s) and the sensors noted above, with each sensor being enclosed within a respective one of the sensor housings. Each sensor has a light emitter and a light receiver. The sensors measure the portion of a light beam received by a respective one of the light receivers. A host machine of a controller executes an algorithm to determine the calculated input force, and/or torques around at least each x, y, and z Cartesian axis, using the portion of the light beam received by the light receivers. Each of the sensor housings modifies the interruption of the light beam when the actual input force is applied by the operator to one or more handles, and the controller, via the host machine and algorithm, automatically controls an action of the robot using the calculated input force.

A method of controlling the robot noted above includes emitting the light beam from a light emitter of a sensor toward a light receiver of the same sensor, modifying an interruption of the light beam by flexing or bending a portion of the sensor housing the actual input force as applied to one or more handles, and then measuring a portion of the light beam received by the light receiver. The method further includes using a controller to determine the calculated input force as a function of the portion of the light beam received by the light receiver, and then automatically controlling an action of the robot using the calculated input force.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
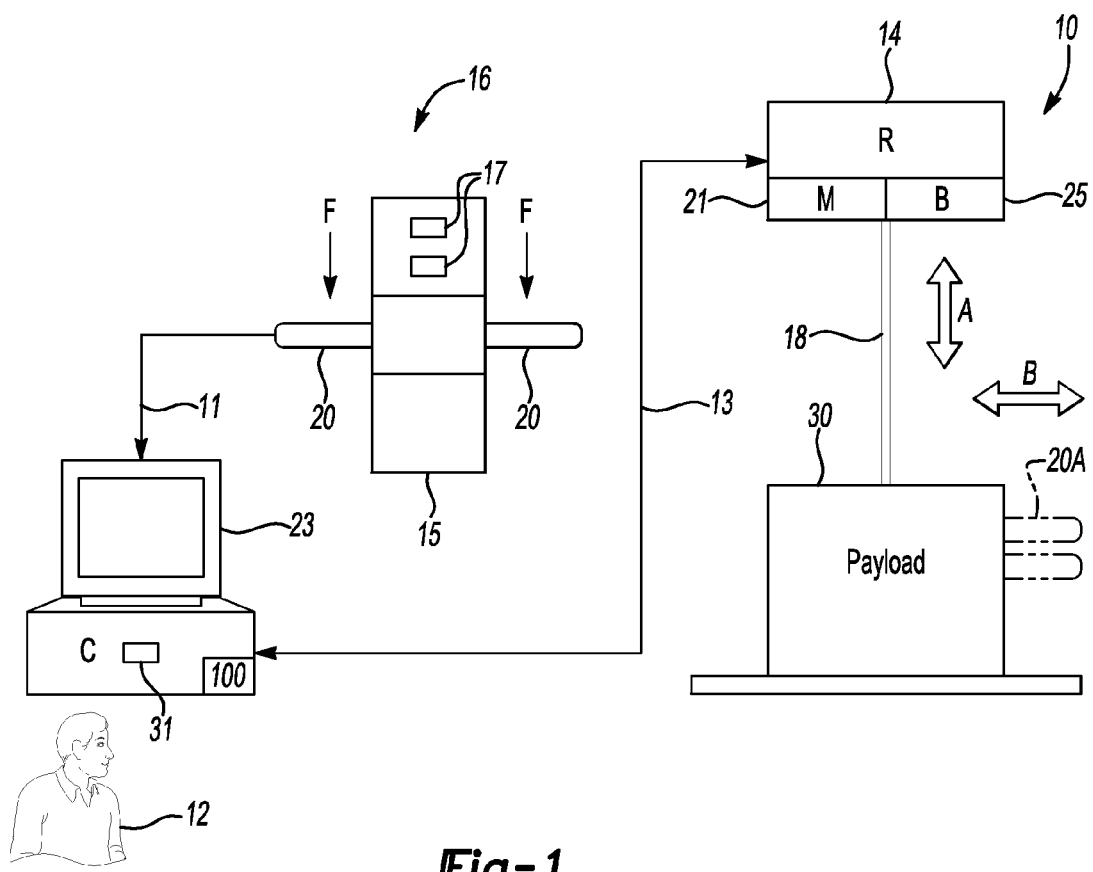
FIG. 1 is a schematic illustration of a Human-Robot Interactive (HRI) system in accordance with the invention.

With reference to the drawings, wherein like reference numbers refer to the same or similar components throughout the several views, FIG. 1 shows a Human-Robot Interactive (HRI) system 10 adapted for performing a robot-assisted task or operation. Within the HRI system 10, a human operator 12 interacts with a robot (R) 14 by imparting an actual input force and/or torque (arrow F) to a handle or handles 20 of a control panel 16, with each handle being specially adapted to receive the input force. While two handles are shown in FIG. 1, a single handle or more than two handles may also be used without departing from the intended scope of the invention. Likewise, while an HRI system 10 is shown in FIG. 1 as one possible embodiment, the handle(s) 20 may be used in any force-sensing and moment-sensing application requiring minimal/zero drift and very low noise levels, as will be understood by those of ordinary skill in the art. For simplicity hereinafter, handles 20 will be referred to in the plural.

In one embodiment, the robot 14 may be configured as an overhead payload assist device adapted for assisting in the positioning of a payload 30 within a work area or cell, as indicated by arrows A and B. The robot 14 may include various actuators, e.g., one or more motors (M) 21 and brakes (B) 25, as well as any required relays, gears, power supplies, power conditioning equipment, etc., needed for operating the robot. Payload 30, for example an automobile engine, transmission, or other relatively cumbersome payload, may be connected to the robot 14 with as many linkage(s) 18 as are suitable for performing the desired operation. Although shown in FIG. 1 as a single linkage for simplicity, the linkage(s) 18 may be configured as a network of cables, pulleys, overhead and/or vertical support members, beams, etc., depending on the size and weight of the payload 30.

The HRI system 10 includes a control system having a controller (C) 23 embodied as a server or a host machine adapted for executing an algorithm 100, and having various components as explained below. Execution of the algorithm 100 by the host machine of controller 23 provides light-interruption based control of robot 14, including control over substantially all of the integrated components necessary for precise control over the actions of the robot. The controller 23 may be configured as a single digital computer or as a distributed network of digital computers, host machines, data processing devices, or servers each having one or more microprocessors or central processing units (CPU), sufficient read only memory (ROM), random access memory (RAM), and electrically-programmable read only memory (EPROM).

The controller 23 may include a high-speed clock, analog-to-digital (A/D) circuitry, digital-to-analog (D/A) circuitry, and any required input/output (I/O) circuitry, I/O devices, and communication interfaces, as well as signal conditioning and buffer electronics. Individual control algorithms resident within the controller 23 or readily accessible thereby, including the algorithm 100 as described below, may be stored in ROM and automatically executed at one or more different control levels to provide the respective control functionality.

Still referring to FIG. 1, control panel 16 may include, in one embodiment, a support structure or frame 15 and the pair of handles 20. Optionally, handles 20 may be directly connected to the payload 30, as represented in phantom by handles 20A. The particular location and distance of handles 20 with respect to the payload 30 may vary without departing from the intended scope of the invention. When the frame 15 is used for support, the frame may be connected to one or more input devices 17, e.g., auto stop buttons, display panels, input keypads, etc., depending on the particular design.

Light displacement resulting from an actual input force (arrow F) applied to each of the pair of handles 20 by operator 12 is measured via a sensor assembly 50 (see FIG. 6) that is connected to the handles, and translated into input signals 11. Input signals 11, which are used to calculate the actual applied force (arrow F), are transmitted to the controller 23 for use by algorithm 100. Control data and feedback data, represented by double arrow 13, may be automatically exchanged between the robot 14 and the controller 23 to ensure precise motion and systems control of the robot in response to the applied force.

The controller 23 measures an electrical response, i.e., a voltage and/or a current value, in response to the applied force to handles 20, as explained below, in order to precisely calculate an applied force and/or torques around each Cartesian axis, i.e., the x, y, and z axes of the handles 20, to within an acceptable range of the actual input force (arrow F). To do so, the controller 23, using the sensor assembly 50 of FIG. 6 and, in one embodiment, one or more lookup tables 31, determines a calculated applied force based on an electrical signal. This signal is a function of the light transmitted through a sensor assembly, such as the embodiment shown in FIG. 6 and described below. By using light interruption rather than measuring a mechanical strain or foil deformation, relative immunity may be achieved to millivolt-level noise and sensor drift.

Figure 2:
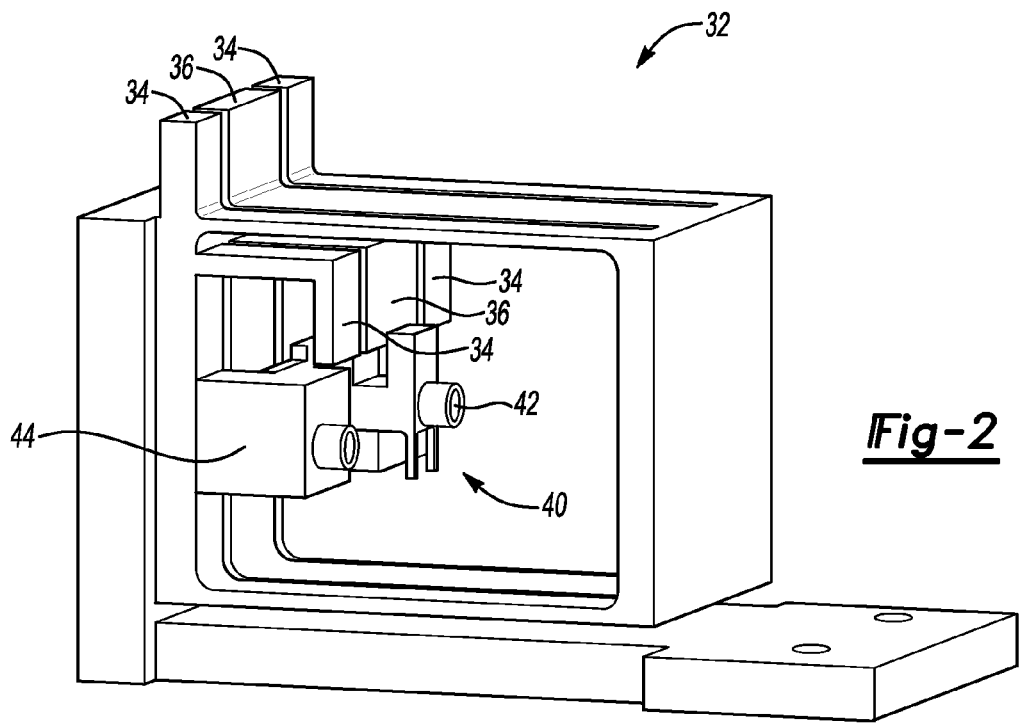
FIG. 2 is a perspective side view illustration of a sensor housing assembly usable with the HRI system of FIG. 1, according to one embodiment.

Referring to FIG. 2, a sensor housing 32 is adapted for securing one or more sensors 40, with the sensors described with reference to FIG. 3. Another embodiment of the sensor housing 32 is shown as sensor housing 132 in FIG. 2A, as described below. The sensor housing 32 converts an external force into a displacement that modifies the amount of light that is interrupted within the sensor(s) 40. The housing 32 also protects the sensor(s) 40, which may be mounted via a fastener 42 to a sensor support member 44 within the sensor housing 32. The sensor housing 32 ultimately secures the sensor to the handles 20 shown in FIG. 1. Each sensor housing 32 contains at least one sensor 40, with multiple housings being interconnected to provide force sensing in each of the x, y, and z Cartesian directions, and/or torque sensing in the θ direction, as explained below with reference to FIG. 5.

Figure 2A:
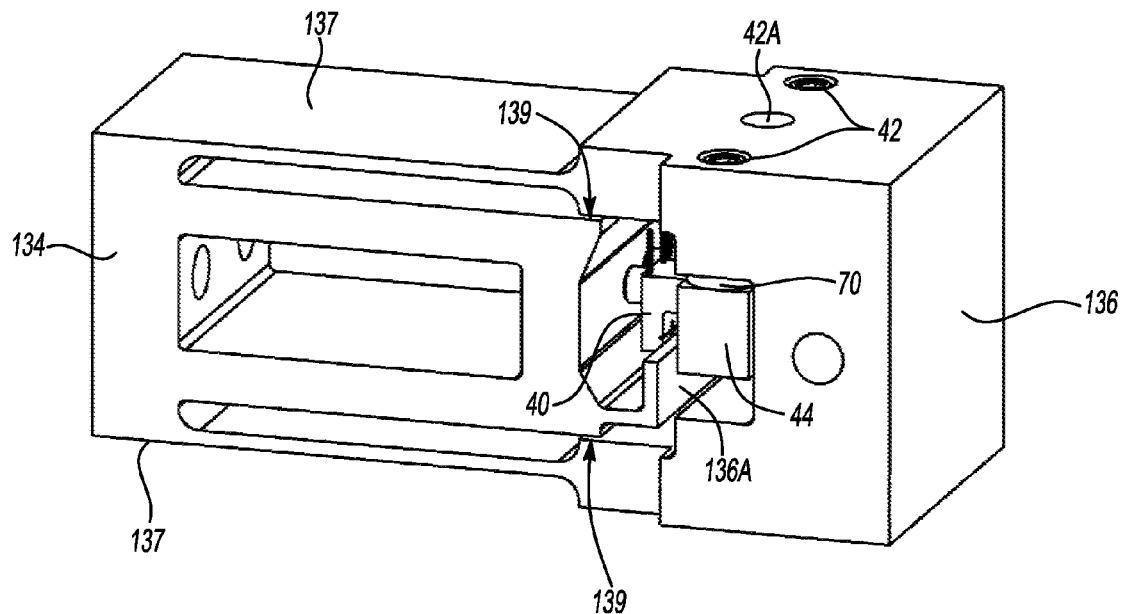
FIG. 2A is a perspective side view illustration of a sensor housing assembly usable with the HRI system of FIG. 1, according to another embodiment.

In the embodiment of FIG. 2, one sensor housing 32 includes first portions 34 and a second portion 36. First portions 34 may be substantially rigid or fixed, while the second portion 36 may be, at least in part, relatively resilient, bendable, or flexible, i.e., is permitted to flex or bend in response to the actual applied force (arrow F) to the handles 20 shown in FIG. 1. Sensor housing 32 may be constructed of any suitable plastic, metal, or composite material having the desired material properties. Movement of the second portion 36 or an appendage thereof, as shown in FIG. 2A, in response to the applied force modifies interruption of a light beam transmitted within sensor 40. Electrical measurements from the sensor 40 are then communicated to the controller 23 of FIG. 1 as the input signals 11. The values of input signals 11 are then used by the controller 23 and algorithm 100 to calculate the applied force (arrow F) an operator 12 applies to the pair of handles 20 shown in FIG. 1.

Referring to FIG. 2A, in another embodiment a sensor housing 132 includes a first portion 134 and a second portion 136. First portion 134 may includes at least one parallelogram each made up of a suitable resilient member 137, e.g., leaf springs, which is substantially compliant in the direction of measurement and substantially rigid in all other directions. Because of the substantial compliance, a force applied along the direction of measurement results in a displacement that can be measured by sensor(s) 40.

Also, because of the substantial rigidity, a force applied along the other directions results in displacements that are small enough to avoid disturbing the measurement of the sensor 40. In such an embodiment, two parallelograms may be stacked in series, with the first parallelogram forming the outer portion of the resilient member 137 and the second parallelogram forming the inner portion of the resilient member 137. In yet another embodiment, only one parallelogram may be used, which is more rigid relative to the dual-parallelogram embodiment.

Housing 132 includes first portion 134 and second portion 136, which are linked by the parallelogram made of the resilient members 137, e.g., two thin leaf springs as shown. In order to limit the range of motion between the two portions and protect the resilient members 137 from potentially abusive forces along the measured direction, the portions 134, 136 may be separated by small gaps 139. It is noted that, because of the construction of the parallelogram made of leaf springs as shown, the forces and torques that can be resisted in the other directions are very large. A light interrupting end 136A is provided as part of, or connected to, the portion 136, while the sensors 40 are attached to the second portion 136 through support member 44.

In order to be correctly used, the sensors 40 should be positioned to obtain a Relative Collector Current (see FIG. 4) of approximately 50% when no force is applied on the sensor housing 132. Since the range of measurement is very small, the sensors 40 should be precisely located. In order to obtain optimal precision, an adjustment system may be integrated. The support member 44 is attached to the second portion 136 by two fasteners 42 that pull on the support member. Also, compliant rubber rings 70, inserted between the support member 44 and the second portion 136, apply a pushing force on the support member. Therefore, it is possible to finely adjust the location of the support member 44, and the sensor(s) 40 attached to it, by screwing and unscrewing the fasteners 42. Once the sensors 40 are correctly positioned, another fastener 42A applies a pushing force on the support member 44 to secure it firmly.

Figure 3:
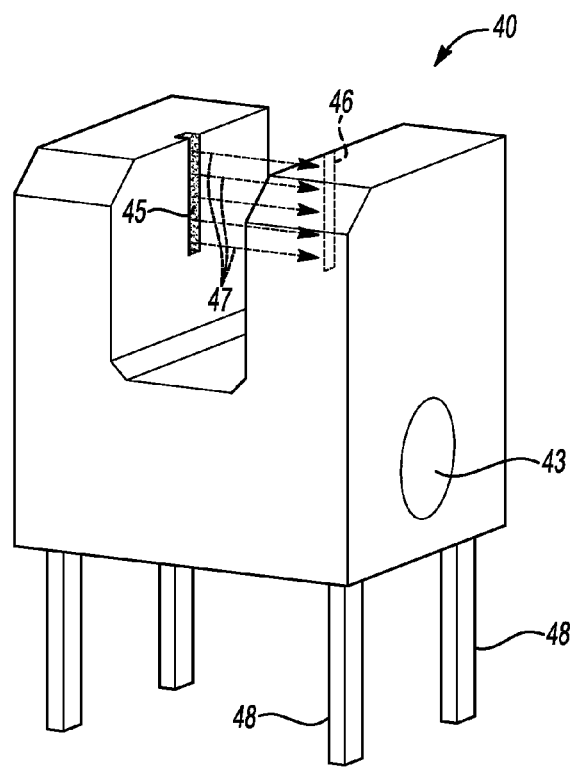
FIG. 3 is a perspective side view illustration of a photo-interruption based sensor usable with the HRI system of FIG. 1.
Figure 4:
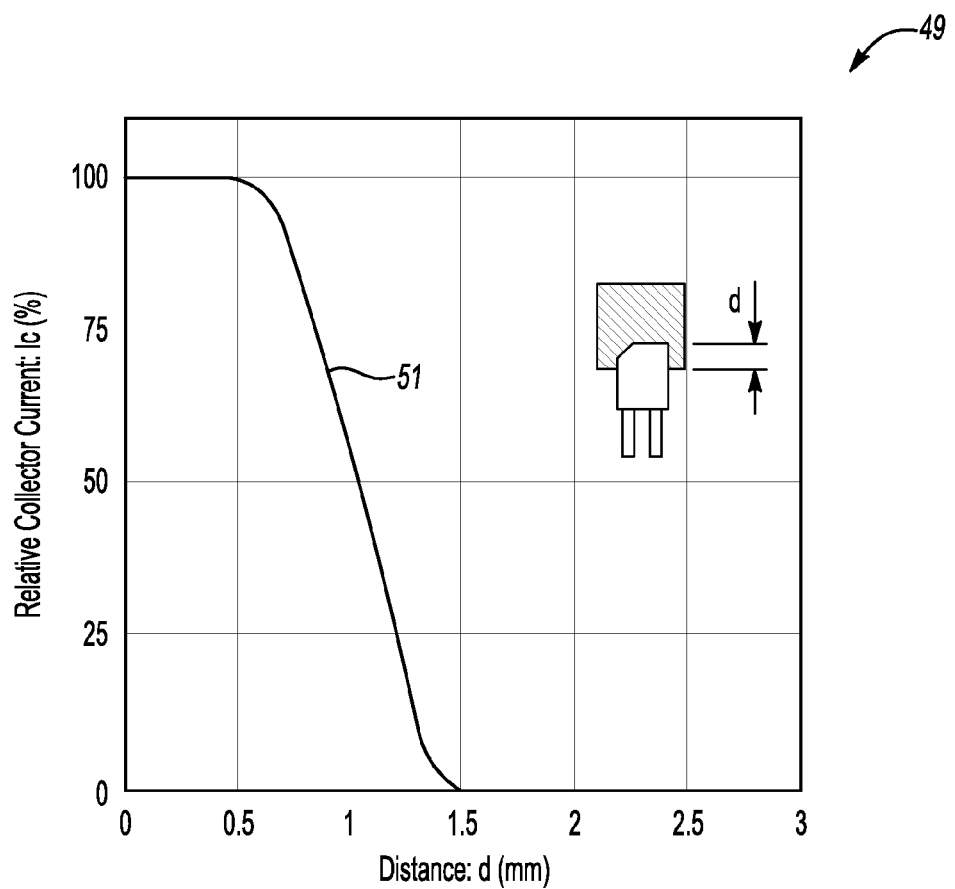
FIG. 4 is a graph describing a relationship between displacement and electrical current in the sensor shown in FIG. 3.

Referring to FIGS. 3 and 4, the sensor 40 is configured to generate a voltage output value based on the amount of light being passed therethrough. The sensor 40 may do so by measuring a percentage of a receive portion of an emitted light, e.g., a light beam. In one embodiment, the sensor 40 may be adapted to measure displacement using a Hall voltage of a Hall effect sensor instead of being configured as a photointerrupter, as is well understood in the art. The amount of light varies in conjunction with the actual input force (arrow F) applied to the pair of handles 20 of FIG. 1. That is, as shown in the graph 49 of FIG. 4, a trace 51 describes a relationship between a deflection distance of the flexible second portion 36 (see FIG. 2) of sensor housing 32 and an amount of light detected by the sensor 40, here represented as a detected current value. In this particular embodiment, a deflection of the second portion 36 or a portion thereof of the sensor housing 32 (see FIG. 2) of approximately 1.5 mm results in a complete blockage of the light beam. However, the trace 51 is illustrative, and its trajectory may vary depending on the design of the sensor 40 and each sensor housing 32 (see FIG. 2).

As shown in FIG. 3, sensor 40 includes a light emitter 45 and a light receiver 46. The emitter 45 may be configured as, by way of example, an infrared (IR) emitter, a light emitting diode (LED), a red/green/blue (RGB) visible laser, or any other device capable of generating and emitting a detectable light beam 47. Receiver 46 may be configured as a phototransistor, photo receptor cells, or any other device capable of receiving light emitted by the emitter 45. A mounting hole 43 may be formed in a portion of the sensor 40, e.g., in proximity to prongs or leads 48 as shown, and adapted to receive a fastener 42 (see FIG. 2) suitable for mounting the sensor to the support member 44 (see FIG. 2).

Figure 5:
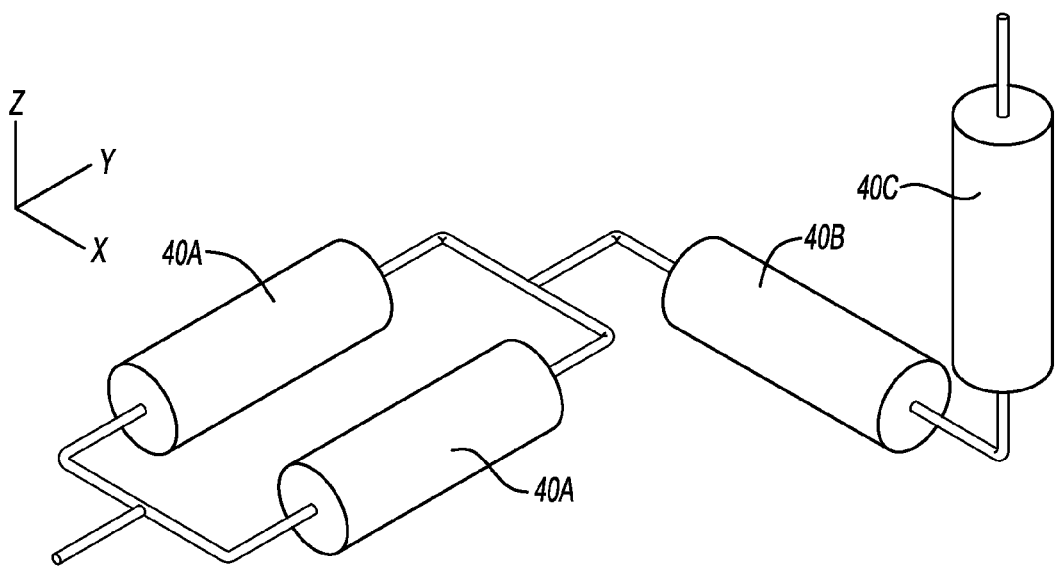
FIG. 5 is a schematic illustration of a series connection of the sensors shown in FIG. 3.

Referring to FIG. 5, within the scope of the invention a plurality of sensors 40A, 40B, 40C, shown schematically for simplicity, are serially arranged to sense deflection of portions 36, 136 of one or more housings 32, 132 described above in a given Cartesian direction, i.e., in each of the x, y, and z directions, or torque in the θ direction, as noted above. As will be explained below in more detail with reference to FIG. 6, one end of sensor 40A of FIG. 5 may be connected to one end of sensor 40B, with the other end connected to the handles 20 (see FIG. 1). The other end of sensor 40B may then be connected to one end of sensor 40C, with the remaining end of sensor 40C connected to panel 15. In this way, a serial chain may be formed from the handles 20, through each sensor 40A, 40B, 40C, and to a stationary mount, e.g., the panel 15. The input force from operator 12 applied to the handles 20 modifies the interruption of light transmission within at least one of the sensors 40A, 40B, 40C in the serial chain described above.

Figure 7:
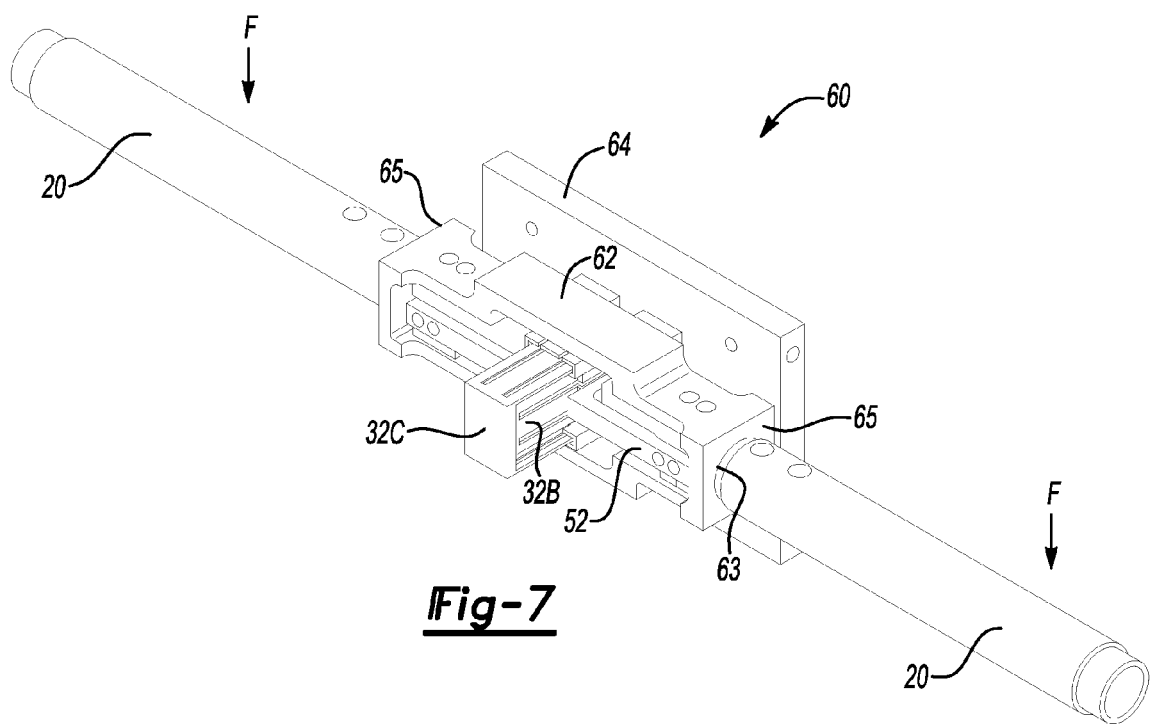
FIG. 7 is a perspective top view illustration of a handle assembly usable with the HRI system of FIG. 1, according to one embodiment.
Figure 7A:
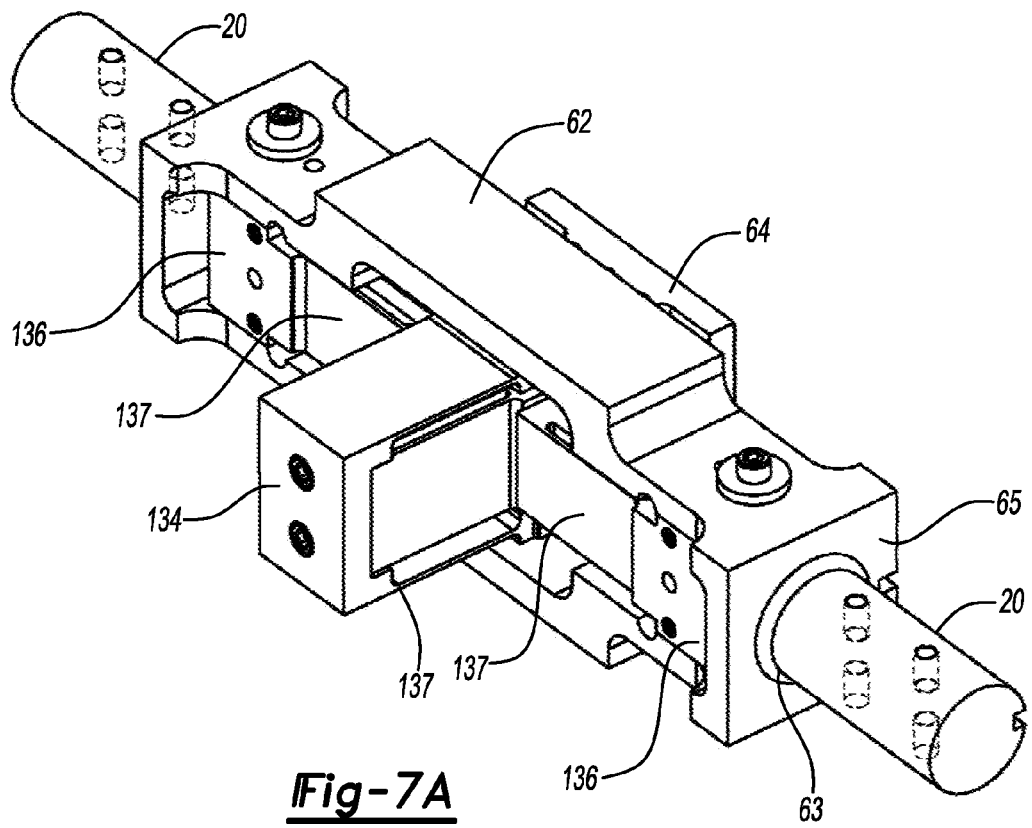
FIG. 7A is a perspective top view illustration of a handle assembly usable with the HRI system of FIG. 1, according to another embodiment.

For measurement in the y direction, a pair of sensors 40A are housed within respective housings 32, 132 (see FIGS. 2 and 2A, respectively) one on either side of the handles 20, 120 (see FIGS. 7 and 7A, respectively). By using the pair of sensors 40A, torque may also be measured around the y axis. Another sensor 40B may be housed in another housing 32 and positioned to measure deflection of portion 36 in the x direction. Finally, a sensor 40C may be housed in a housing 32 and positioned to measure deflection of portion 36 in the z direction.

Figure 6:
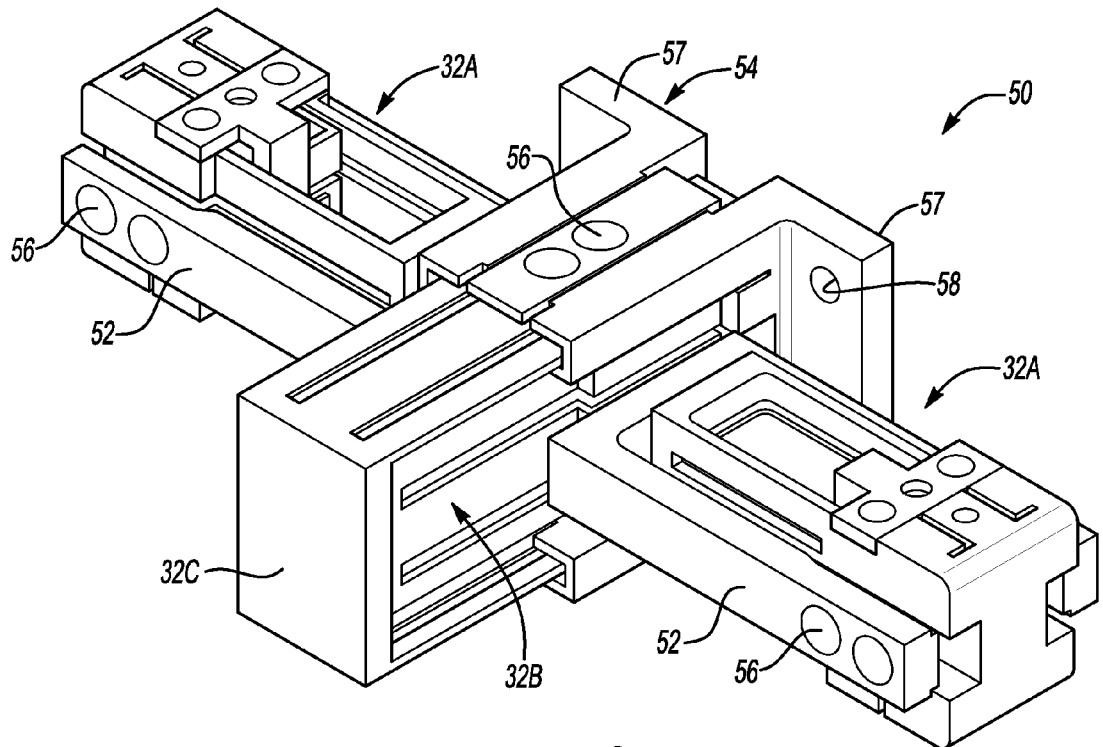
FIG. 6 is a perspective top view illustration of a sensor assembly usable with the HRI system of FIG. 1.

Referring to FIG. 6, according to one embodiment a sensor assembly 50 usable with the HRI system 10 of FIG. 1 includes the sensors 40A, 40B, and 40C shown schematically in FIG. 5 and explained above. The sensor housing 32B of sensor 40B may be positioned within a sensor housing 32C of sensor 40C, with the housings 32B, 32C of these sensors secured to a mounting piece 54 via fasteners 56. The mounting piece 54 includes feet 57 with mounting holes 58, with the feet being secured to a sufficiently rigid surface 64 (see FIG. 7), e.g., a surface of the control panel 16 or another fixed surface. Each of the sensors 40A (see FIG. 5) are contained within a respective one of the sensor housings 32A, and may be linked via connecting members 52 and fasteners 56, such that the sensor housings 32A generally form a T-shape structure in conjunction with the sensor housings 32B, 32C.

For the connection of the various housings 32, i.e., housings 32A, 32B, and 32C, the outer portions 34 of housing 32A may be connected to the handles 20 of FIGS. 1 and 7. The portion 36 of housing 32A may be connected to the portion 36 of housing 32B, with the portions 36 shown in FIG. 2. First portions 34 of housing 32B may be connected to the second portion 36 of housing 32C, with the portion 36 shown in FIG. 2. The portion 36 of housing 32C may connect to the mounting piece 54.

Referring to FIGS. 7 and 7A, a handle assembly 60, 160 is shown that is usable with the HRI system 10 of FIG. 1, and with housings 32 of FIG. 2 and 132 of FIG. 2A, respectively. Handle assembly 60, 160 includes the handles 20, and sensors 40 as shown in FIG. 3, of which the housings 32B, 32C and the interconnecting members 52 are shown in FIG. 7, and portions 134, 136 of various housings 132 are shown in FIG. 7A. A sensor assembly center housing 62 is pivotally connected to the housings 32, 132 and adapted to contain the sensor assembly, e.g., the assembly 50 of FIG. 6. Each handle 20 is then rigidly attached to the center housing 62. Therefore, each handle 20 is connected, via the center housing 62, to the sensor assembly therein such that an applied force to handles 20 ultimately modifies an interruption of a transmission of light in the sensor 40 (see FIG. 3) positioned in that sensor housing 32, 132 as described hereinabove.

Figure 8:
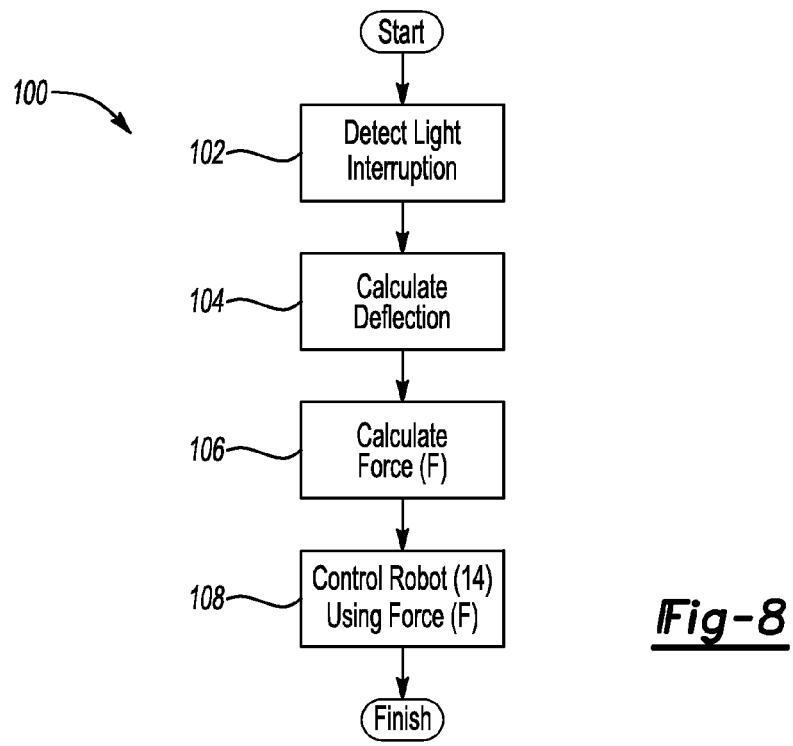
FIG. 8 is a flow chart describing a method for controlling a robot of the system shown in FIG. 1.

Referring to FIG. 8, the algorithm 100 is executable via the controller 23 of FIG. 1, and begins with step 102, wherein the operator 12 of FIG. 1 applies an actual input force (arrow F) to each handle 20. As explained above, application of this force by an operator ultimately bends or flexes the second portion 36, 136 of one or more of the sensor housings 32, 132 shown in FIGS. 2 and 2A, respectively. This flexing of portion 36, 136 causes a modification in an amount of interruption of a transmission of light by an emitter 45 of one or more of the sensors 40 (see FIG. 3).

Step 102 therefore includes detecting a level or amount of light interruption via the controller 23, i.e., by measuring the amount of light reaching one or more of the receivers 46, at a frequency of the sampling system. For every cycle of the calibrated sampling rate, the controller will acquire the sensor value and evaluate for control commands. Once a voltage, current, or other suitable electrical signal has been generated or otherwise determined in this manner, the algorithm 100 proceeds to step 104.

At step 104, the controller 23, using the electrical signal from sensor 40, i.e., the input signals 11 shown in FIG. 1, calculates the amount of displacement of second portions 36 of housings 32A, 32B, and 32C of FIG. 6. Step 104 may include, for example, a direct calculation using known sizes and dimension of the housings 32A, 32B, and 32C, and known properties of emitter 45, and/or by reference to calibrated lookup table(s) 31 accessible by the controller 23, as shown in FIG. 1. Once the displacement has been determined, algorithm 100 proceeds to step 106.

At step 106, the controller 23 determines a calculated applied force using the displacement caused by the actual input force (arrow F) applied to the handle(s) 20, i.e., using the deflection value from step 104. Again, the controller 23 may reference lookup table(s) 31, which may be one or more lookup tables depending on the design. The controller 23 may also calculate the applied force using the deflection value and known physical properties of the sensor housings 32, e.g., stiffness, strength, resiliency, etc. Once the applied force is properly determined, the algorithm 100 proceeds to step 108.

At step 108, the controller 23 controls an operations of robot 14 (see FIG. 1), or of any other system using the handles 20, using the calculated input force as explained above, and by transmitting the control command based on the calculated input force to the robot via the control and feedback data (double arrow 13). One loop of the algorithm 100 is then finished. The algorithm 100 may be executed once per cycle, as noted above at step 102.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
   at least one handle;
   a robot adapted for moving a payload in response to a calculated input force, the calculated input force being determined when a human operator applies an actual input force to the at least one handle;
   a plurality of sensors each enclosed within a respective sensor housing, and operatively connected to the at least one handle, wherein each of the plurality of sensors includes a light emitter adapted for emitting a light beam and a light receiver adapted for receiving at least a portion of the light beam, and wherein each of the plurality of sensors is adapted for measuring the portion of the light beam received by a respective one of the light receivers; and
   a controller having a host machine and an algorithm, the algorithm being executable by the host machine to thereby determine the calculated input force using the portion of the light beam received by each of the plurality of light receivers;
   wherein each of the respective sensor housings corresponds to a different one of an x, y, and z Cartesian direction of measurement, and includes a resilient member disposed between a pair of rigid portions, wherein the resilient member is compliant only in the x, y, or z Cartesian direction of measurement for the corresponding sensor housing, and is adapted to interrupt a transmission of the light beam when the actual input force is applied to the at least one handle by the operator in the Cartesian direction of measurement, and wherein the controller is adapted to automatically control an action of the robot using the calculated input force.

2. The robotic system of claim 1, wherein the robot is configured as an overhead lift assistance mechanism including at least a motor and a brake.

3. The robotic system of claim 1, wherein an application of the actual input force bends or flexes the resilient member into a path of the light beam to at least partially interrupt a transmission of the light beam.

4. The robotic system of claim 1, wherein the plurality of sensors are adapted for determining the actual input force in the x, y, and z Cartesian directions of measurement by measuring the portion of the light beam received by each of the plurality of light receivers.

5. The robotic system of claim 4, wherein at least one of the sensor housings is enclosed within another one of the sensor housings.

6. The robotic system of claim 1, wherein the plurality of sensors are adapted for measuring a torque by measuring the portion of the light beam received by each of the plurality of light receivers.

7. The robotic system of claim 1, further comprising a sensor assembly housing operatively connected to the at least one handle, wherein the sensor assembly housing is adapted for containing the plurality of sensor housings.

8. The robotic system of claim 1, wherein the sensors are positioned to obtain a relative collector current of approximately 50% when the actual input force is not being applied to the at least one handle.

9. The robotic system of claim 1, wherein the plurality of sensors includes three sensors arranged with respect to each other to form a T-shape structure mounted to the at least one handle.

10. A control system for providing motion control of a robot adapted for moving a payload in response to a calculated input force, the calculated input force being determined when a human operator applies an actual input force to a handle, the control system comprising:
   a plurality of sensor housings each operatively connected to the handle, wherein each of the sensor housings corresponds to a different one of an x, y, and z Cartesian direction of measurement, and includes a resilient member disposed between a pair of rigid portions, wherein the resilient member is compliant only in the x, y, or z Cartesian direction of measurement for the corresponding sensor housing;
   a plurality of sensors each enclosed within a respective one of the plurality of sensor housings, wherein each of the plurality of sensors includes a light emitter adapted for emitting a light beam and a light receiver adapted for receiving at least a portion of the light beam, and wherein each of the plurality of sensors is adapted for measuring the portion of the light beam received by a respective one of the light receivers; and
   a host machine having an algorithm adapted, when executed by the host machine, to determine the calculated input force using the portion of the light beam received by each of the plurality of light receivers;
   wherein the resilient member of each of the respective sensor housings is adapted to at least partially interrupt a transmission of the light beam in a corresponding one of the x, y, and z Cartesian directions of measurement when the actual input force is applied by the operator to the handle, and wherein the host machine is adapted to execute the algorithm to automatically control an action of the robot using the calculated input force.

11. The control system of claim 10, wherein the actual input force flexes the resilient member into a path of the light beam to at least partially interrupt the light beam.

12. The control system of claim 10, wherein at least one of the sensor housings is enclosed within another one of the sensor housings.

13. The control system of claim 10, wherein the plurality of sensors are adapted for measuring a torque around each x, y, and z Cartesian axis by measuring the portion of the light beam received by each of the plurality of light receivers.

14. The control system of claim 10, further comprising a sensor assembly housing operatively connected to the handle, wherein the sensor assembly housing contains the plurality of sensor housings and is adapted for securing the sensor housings to a substantially rigid surface.

15. The control system of claim 10, wherein the plurality of sensors includes three sensors arranged with respect to each other to form a T-shape structure.

16. A method of controlling a robot adapted for moving a payload in response to a calculated input force that is determined using an actual input force applied by a human operator to a handle of a handle assembly, the method comprising:
   arranging three sensor housings into a T-shape structure, wherein each sensor housing corresponds to one of an x, y, and z Cartesian direction of measurement, and wherein each sensor housing includes a resilient member disposed between a pair of rigid portions that is compliant only in the Cartesian direction of measurement for the corresponding sensor housing;
   emitting a light beam from a light emitter of each of the sensors toward a corresponding light receiver;
   flexing the resilient member of at least one sensor housing using the actual input force to the handle to thereby modify an interruption of a transmission of the light beam by the resilient member within the sensor;
   measuring a portion of the light beam received by the corresponding light receiver;
   using a host machine to determine the calculated input force as a function of the portion of the light beam received by the corresponding light receiver; and
   automatically controlling an action of the robot using the calculated input force.

17. The method of claim 16, wherein measuring a portion of the light beam received by the corresponding light receiver includes measuring a voltage output signal at the light receiver of each sensor.

18. The method of claim 16, wherein using a host machine to calculate the input force as a function of the portion of the light beam received by the light receiver includes using the controller to automatically access at least one calibrated lookup table.

19. The method of claim 16, wherein the robot is an overhead assist device and the payload is one of an engine and a transmission, and wherein automatically controlling an action of the robot includes moving one of a transmission and an engine using the overhead assist device.

* * * * *